Apr. 10, 1923.

M. C. SCHWEINERT ET AL 1,451,307

PRESSURE GAUGE

Filed Mar. 28, 1910

WITNESSES:
Fred White
William F. Martinez

INVENTORS:
Maximilian Charles Schweinert
and Henry P. Kraft,

By Attorneys,
Arthur C. Fraser & Usina

Patented Apr. 10, 1923.

1,451,307

UNITED STATES PATENT OFFICE.

MAXIMILIAN CHARLES SCHWEINERT, OF WEST HOBOKEN, NEW JERSEY, AND HENRY P. KRAFT, OF BROOKLYN, NEW YORK, ASSIGNORS TO A. SCHRADER'S SON, INC., OF NEW YORK, N. Y., A CORPORATION OF NEW YORK.

PRESSURE GAUGE.

Application filed March 28, 1910. Serial No. 552,111.

*To all whom it may concern:*

Be it known that we, MAXIMILIAN CHARLES SCHWEINERT, residing in West Hoboken, in the county of Hudson and State of New Jersey, and HENRY P. KRAFT, residing in the borough of Brooklyn, county of Kings, city and State of New York, both citizens of the United States, have jointly invented certain new and useful Improvements in Pressure Gauges, of which the following is a specification.

This invention relates to pressure gauges and aims to provide certain improvements therein.

The chief object of the present invention is to provide a gauge which is adapted to be temporarily applied to a valve shell of a pneumatic tire or other container of air or gasses under pressure, and to register the pressure therein in such manner that the pressure can be read after the gauge is removed from the valve. The invention in its preferred form comprises a pressure member which is adapted to respond to the pressure within the tire combined with an indicating member which is moved to its various indicating positions by the pressure member. The pressure member is adapted to return to its initial position when the pressure is relieved, while the indicating member is adapted to be retained in its indicating position until manually restored. The invention also includes a means for causing the pressure member to accurately respond to the pressure. It has been found in practice that when a gauge of this type is applied to a tire valve to determine the pressure within the tire, the air under pressure being suddenly admitted to the gauge is apt, by its momentum, to move the pressure member to a point beyond that which corresponds to the pressure within the tire. In a gauge which is intended to remain upon the tire valve until the pressure is read this operation is not so objectionable since when the momentum of the entering stream of air has exhausted itself the registering plunger will retire to approximately its proper indicating position. With a gauge in which either the plunger or the indicating member is held in the outermost position to which it is moved in order to permit reading of the pressures after the gauge is removed, it becomes very desirable that the pressure member should not advance beyond the point corresponding to the pressure within the tire. Our invention prevents this over-indicating or jumping of the pressure member, preferably by the provision of an enlarged air chamber located in advance of the pressure member and having a very small opening leading therefrom so that the momentum of the air is exhausted, or nearly so, within the air chamber and the pressure affecting the pressure member is more or less gradually increased up to the point of maximum pressure in the tire. Our invention includes other features of improvement which will be hereinafter pointed out.

Referring to the drawings which indicate one form of the invention.

Figure 1:
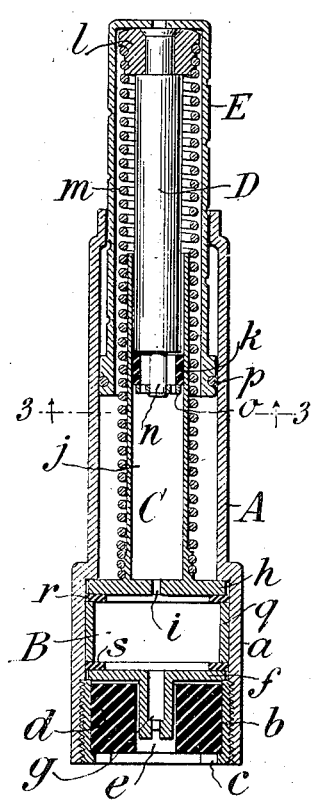
Figure 1 is a diametrical section of a gauge embodying our invention.

Referring to the drawings which illustrate the preferred embodiment of the invention, let A indicate a shell or casing having an enlarged lower end *a* within which is screwed a hollow plug *b* having notches *c* or other means for engaging a suitable tool. The plug *b* contains a circular block of rubber or other packing material *d* having a central aperture *e* said block *d* constituting a press-on seat for the gauge. Above the packing *d* is a metal disc *f* which has fixed to its central part a tubular extension or depressor *g* slotted on its lower end in such manner that when the device is passed over the end of a tire valve the extension *g* will depress the deflating pin of the valve so that the air within the tire will pass through the slots in the extension up through the bore thereof into an expansion chamber B.

The provision of the chamber B is an important feature of the present invention. It provides a space of relatively large capacity into which the incoming stream of air under high pressure is led, and within which such stream loses its momentum to a great extent. In the upper part of the chamber B is a disc *h* having a small opening $i$ leading to the presure chamber C. The latter is formed essentially of a tube $j$ soldered or otherwise connected at its lower end to the disc $h$. Within this tube moves the pressure responsive member D which at its lower end is constructed as a piston provided with a packing $k$. The upper end of the presure member D is enlarged at $l$ to form a head to which is connected the loading spring $m$ which is also connected at its lower end to the tube $j$ as shown. The result of this construction is that the pressure member D rises against the tension of the spring until the pressure is relieved (as by removal of the gauge from the valve), whereupon it is retracted to its lowermost or zero position.

Figure 3:
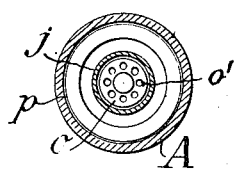
Fig. 3 is a section on the line 3—3 in Fig. 1.

The bottom of the piston may be packed in any suitable way, and in certain cases the cylindrical pressure member D may fit nicely within the tube $j$ so that an independent packing is unnecessary. We prefer, however, to provide a packing which will not introduce any undesirable friction, so that the movements of the pressure member D may be as little affected as possible. In Figures 1 and 3 we have shown the packing $k$ as a ring of leather encircling a pin or post $n$ having at its outer end a perforated plate $o$, the perforations of which lead to an annular space within the packing. When the air is admitted into the pressure chamber C it passes through the perforations $o'$ and expands the packing $k$ sufficiently to make a reasonably tight joint between the parts.

An important feature of the invention is the provision of an indicating and registering device, which while moved by the pressure member to its varying positions, will nevertheless retain its indicating position after the gauge is removed from the tire valve and after the plunger by the relief of pressure beneath it returns to its zero position. Any suitable device may be provided for this purpose, but we prefer the construction shown, wherein a member E is provided which slides within the casing. For compactness the member E is preferably formed as a cap or sleeve within which the pressure member D extends so that its head presses against the interior of the upper end of the sleeve. The cap or sleeve E serves as a guide for the pressure member when the pressure member and sleeve are in their extended position. The latter is designed to be frictionally held in any one of its indicating positions after the plunger is retracted. In order that the frictional grip may be as uniform as possible under varying conditions of use we preferably provide an expanding metallic friction ring $p$ which is shown as confined within a groove formed in the lower end of the sleeve. This friction ring is formed of light metal or wire and preferably introduces only just sufficient friction to prevent the sleeve from falling under its own weight.

For constructional purposes we preferably introduce a short length of metal tubing $q$ between the discs $f$ and $h$ and on either side of such tubing we provide a leather or other suitable packing ring $r$ or $s$. This enables us to simplify the construction of the parts and to provide suitable packings at proper points, all of which are compressed by the screwing in of the hollow plug $b$. When the latter is tightly in place leakage is prevented at the various joints.

Figure 2:
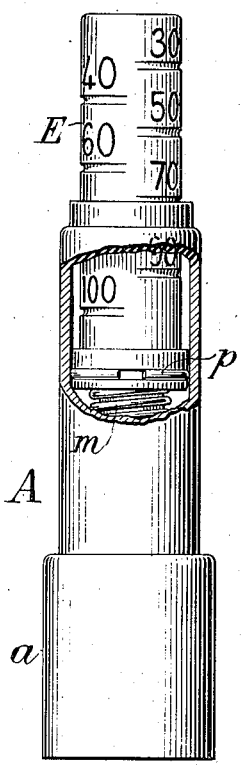
Fig. 2 is a side elevation thereof partly in section.

In operation the device is pressed down over the open end of a tire valve, and the deflating pin of the latter is thereby depressed and the air under pressure within the tire rushes into the expansion chamber B. Its momentum is sufficiently checked and its flow through the small passage $i$ into the pressure chamber C is sufficiently retarded to cause a steady increase of pressure within the pressure chamber, thus moving the pressure member D against the tension of its spring until the pressures within the pressure chamber and tire are equalized and the indicating member E rises to a position corresponding to the pressure. The gauge is then removed to facilitate the reading and the pressure member D, being no longer upheld by the pressure, is retracted by its spring leaving, however, the indicating member E in position to which it was previously moved. As is shown in Fig. 2 the member E is preferably provided with a scale, the top of the casing A of the construction shown serving as a pointer. When the indication is read the member E is pushed down by hand to its lowermost position, and the gauge is then ready to be again used.

Figure 5:
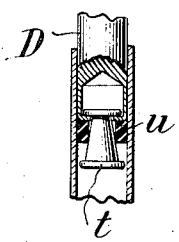
Figs. 5–9 are detail views of several forms of packing.
Figure 4:
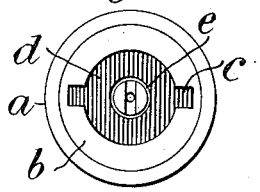
Fig. 4 is a bottom view of the gauge.
Figures 6, 7, 8:
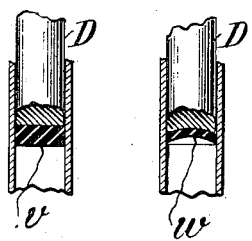
Figure 9:
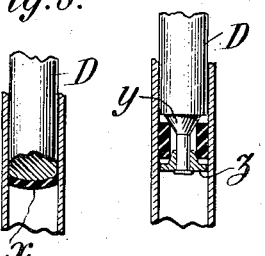

In Figures 5, 6, 7, 8 and 9 we have shown several forms of packing which are suitable for the member D. In Fig. 5 a tapering plug $t$ is provided which moves upwardly under pressure thus expanding the washer. In Fig. 6 a plain plug $v$ is used which seats against a flat face on the plunger D. The plug $v$ is carried upwardly by the pressure and downwardly by the member D. In Fig. 7 the under face of the member D is concaved so that it partially receives a thin packing disc $w$, while in Figure 8 it is convexed at its lower end and the packing disc $x$ follows its contour. In Fig. 9 the member D is provided with a pivot having a conical or tapering portion $y$ while a plate $z$ sliding on the pin has a corresponding tapering portion. The pressure on the under side of the plate $z$ thus expands the packing ring outwardly.

While we have shown and described one form of the invention it is understood that we do not wish to be limited thereto since other constructions may be adopted which embody the essential features of the invention. For instance, the indicating member E may be held in its indicating positions through any other frictional means than that described, or it may be so held by any other suitable means. Furthermore, the expansion chamber B may be constructed in any desirable manner, and may be employed with good results wherever analogous conditions prevail. For instance, in pressure indicators which are intended to form a part of a pump coupling it has been found in practice that the strokes of the pump produce corresponding pulsations of the air in the gauge and these pulsations cause a jumping or fluctuating of the indicating member. The provision of an expansion chamber in this type of gauge prevents such pulsating movements. Other modifications and uses of the features of our invention will suggest themselves to those skilled in the art.

What we claim is:—

1. A portable gauge for pneumatic tires, comprising a casing, an interior indicating member slidable within said casing, a pressure-responsive member, said interior indicating member being adapted to be moved to indicating position by said pressure-responsive member, and being adapted to remain in said indicating position, said pressure-responsive member being free to retract without carrying with it said interior indicating member, means for detachably connecting said gauge to a tire valve, and a depressor for the tire valve.

2. A portable gauge for pneumatic tires, comprising a tubular casing, a longitudinally movable pressure-responsive member, said pressure-responsive member being elongated and approximating in length the length of said casing, an elongated indicating member of a length approximating the length of said casing, and adapted to telescope therewith, said indicating member being adapted to be moved to indicating position by said pressure-responsive member, and being adapted to remain in said indicating position, said pressure responsive member being free to retract without carrying with it said indicating member, means for detachably connecting said gauge to a tire valve, and a depressor for the tire valve.

3. A portable gauge for pneumatic tires, comprising a tubular casing, a longitudinally movable pressure-responsive member, said pressure-responsive member being elongated and approximating in length the length of said casing, an elongated tubular indicating member telescopically slidable with relation to said casing, said tubular indicating member being of a length approximating the length of said casing, said tubular indicating member being adapted to be moved to indicating position by said pressure-responsive member, and being adapted to remain in said indicating position, said pressure-responsive member being free to retract without carrying with it said tubular indicating member, means for detachably connecting said gauge to a tire valve, and a depressor for the tire valve.

4. A portable gauge for pneumatic tires, comprising a tubular casing, a longitudinally movable pressure-responsive member, said pressure responsive-member being elongated and approximating in length the length of said casing, an elongated interior tubular indicating member telescopically slidable within said casing, said tubular indicating member being of a length approximating the length of said casing, said tubular indicating member being adapted to be moved to indicating position by said pressure-responsive member, and being adapted to remain in said indicating position, said pressure-responsive member being free to retract without carrying with it said tubular indicating member, means for detachably connecting said gauge to a tire valve, and a depressor for the tire valve.

5. A portable gauge for pneumatic tires, comprising a casing, a pressure cylinder inside of said casing, an indicating sleeve between said casing and cylinder, a piston in said cylinder, said piston being adapted to actuate said indicating sleeve, and means for detachably connecting said gauge to a tire valve.

6. A portable gauge for pneumatic tires, comprising a casing, a pressure cylinder inside of said casing, an indicating sleeve between said casing and cylinder, a piston in said cylinder, said piston being adapted to actuate said indicating sleeve, said piston also being movable independently of said indicating sleeve, and means for detachably connecting said gauge to a tire valve.

7. A fluid pressure gauge comprising a casing, a pressure-responsive member in said casing, an elongated indicating sleeve slidable with reference to the casing, said pressure-responsive member entering within said sleeve and bearing against the outer end thereof and said sleeve being adapted to extend beyond the casing in use.

8. A fluid pressure gauge comprising a casing, a pressure-responsive member in said casing, a spring for loading said pressure-responsive member also in said casing, and an indicating sleeve movable independently of the pressure-responsive member arranged within the casing between said spring and the casing and surrounding said spring.

9. A pressure gauge comprising a tubular casing, a tubular indicating sleeve movable longitudinally of the casing to a position where it extends longitudinally beyond the casing, and a pressure-responsive member within the casing and sleeve, and capable of movement independently of the sleeve, said pressure-responsive member operating against the outer end of the sleeve and adapted to move beyond the end of the casing, whereby said sleeve acts as a guide for said pressure-responsive member beyond the end of the casing.

10. In a pressure gauge for pneumatic tires, the combination of a casing constructed to be applied to the valve casing of a tire, a spring resisted piston mounted within the casing so as to be acted upon by air transmitted from the tire, and a gauge member slidable within the casing in the same direction as the piston and having a portion adapted to be engaged by the piston when the latter is moved outwardly, the piston being adapted to return to normal position independently of said member.

11. A pressure gauge comprising an air cylinder having a part to engage a tire valve or the like, a pressure responsive element in said cylinder, an independent and free registering device separate from the pressure responsive element projecting slidably into said cylinder and adapted to contact with said pressure responsive element in its various actuated positions.

12. A pressure gauge for pneumatic tires comprising a casing, a pressure responsive member movable within the interior of said casing, a tubular indicating member of a length greater than the normal movements of said pressure-responsive member, said indicating member being movable to positions of greater or less projection from the casing, and being unconnected to said pressure-responsive member, and frictional means for holding said indicating member in its various indicating positions.

13. A presure gauge for pneumatic tires comprising a casing, a pressure-responsive member, a tubular indicating member arranged exteriorly of said pressure-responsive member and being of a length greater than the normal movements of said pressure-responsive member, said indicating member being movable to positions of greater or less projection from the casing, and being unconnected to said pressure-responsive member, and frictional means for holding said indicating member in its various indicating positions.

14. A portable gauge for pneumatic tires comprising a tubular casing having a press-on seat for quick application to a tire valve, a depressor for opening such valve, a spring-resisted pressure-responsive member movable longitudinally within the casing upon the admission of air thereto through said seat, and an indicating member slidable with relation to the casing, engaged by, but unconnected to, the pressure-responsive member, and having means for holding said indicating member in any position to which it may be moved by the pressure-responsive member, such means involving a frictional engagement with an immovable part of the gauge generating so little friction that the pressure required to move it is a negligible fraction of the pressure exerted to move the pressure-responsive member, while such friction is sufficient to reliably hold the indicating member stationary in any position in which it may be left, so that its indication can be observed after the removal of the gauge from the tire valve.

15. A portable gauge for pneumatic tires comprising a tubular casing having a press-on seat for quick application to a tire valve, a depressor for opening such valve, a spring-resisted pressure-responsive member movable longitudinally within the casing upon the admission of air thereto through said seat, the gauge having a relatively large air-chamber between the seat and pressure-responsive member, and a restricted orifice opening thereinto, whereby the air entering from the valve shall be so choked as to build up the pressure in said chamber gradually and avoid any sudden movement of the pressure-responsive member such as to carry it beyond the position due to the air-pressure, so that over-registering is avoided.

16. A gauge comprising an elongated casing, an indicating sleeve telescoping with said casing and in indicating positions extending beyond said casing, and pressure-responsive means arranged within the gauge and adapted on pressure to move said indicating sleeve to its extended indicating positions, said sleeve sliding along the interior of said casing and being disconnected from said pressure-responsive member so that it moves only outwardly therewith.

In witness whereof we have hereunto signed our names in the presence of two subscribing witnesses.

MAXIMILIAN CHARLES SCHWEINERT.
HENRY P. KRAFT.

Witnesses:
  Eugene V. Myers,
  Fred White.